(12) United States Patent
Lin et al.

(10) Patent No.: US 8,484,089 B1
(45) Date of Patent: Jul. 9, 2013

(54) METHOD AND SYSTEM FOR A HOSTED DIGITAL MUSIC LIBRARY SHARING SERVICE

(75) Inventors: Daniel J. Lin, San Francisco, CA (US); Christopher K. Hess, San Francisco, CA (US); Eric F. Allen, San Ramon, CA (US)

(73) Assignee: Pendragon Wireless LLC, Kirkland, WA (US)

( * ) Notice: Subject to any disclaimer, the term of this patent is extended or adjusted under 35 U.S.C. 154(b) by 580 days.

(21) Appl. No.: 12/353,662

(22) Filed: Jan. 14, 2009

Related U.S. Application Data

(60) Provisional application No. 61/020,956, filed on Jan. 14, 2008.

(51) Int. Cl.
  *G06Q 30/00* (2012.01)
  *G06F 17/30* (2006.01)
(52) U.S. Cl.
  USPC ........................................ 705/26.1; 705/27.1
(58) Field of Classification Search
  USPC ...................... 705/26–27.2, 51–59
  See application file for complete search history.

(56) References Cited

U.S. PATENT DOCUMENTS

| | | | |
|---|---|---|---|
| 8,229,856 B1* | 7/2012 | Reddick | 705/50 |
| 2002/0023101 A1* | 2/2002 | Kurihara et al. | 707/205 |
| 2006/0010075 A1* | 1/2006 | Wolf | 705/57 |
| 2007/0011095 A1* | 1/2007 | Vilcauskas et al. | 705/51 |
| 2007/0016654 A1* | 1/2007 | Bowles et al. | 709/217 |
| 2007/0198426 A1* | 8/2007 | Yates | 705/59 |
| 2007/0226503 A1* | 9/2007 | Sugimoto et al. | 713/172 |
| 2007/0255580 A1* | 11/2007 | Cole et al. | 705/1 |
| 2007/0265974 A1* | 11/2007 | Chang | 705/57 |
| 2008/0027867 A1* | 1/2008 | Forbes et al. | 705/51 |
| 2008/0109910 A1* | 5/2008 | Day et al. | 726/27 |
| 2008/0257134 A1* | 10/2008 | Oppenheimer | 84/609 |
| 2008/0270307 A1* | 10/2008 | Olson et al. | 705/51 |
| 2008/0319867 A1* | 12/2008 | Rosenberg et al. | 705/26 |

OTHER PUBLICATIONS

"Apple Launches EU iTunes Music Store." PR Newswire. Oct. 26, 2004. [recovered from Dialog on Sep. 20, 2012].*

* cited by examiner

*Primary Examiner* — Peter Choi
*Assistant Examiner* — Kathleen G Palavecino
(74) *Attorney, Agent, or Firm* — Stattler-Suh PC

(57) ABSTRACT

A hosted web service is provided to enable the legitimate sharing and reselling digital music among subscribers to the web service by leveraging the teachings of the first sale doctrine of copyright law. By maintaining a single copy of properly purchased song within the system that can be only accessed by one subscriber at a time, the web service preserves the rights of the copyright holder of the digital music while encouraging a community sharing.

20 Claims, 11 Drawing Sheets

FIGURE 3

| Title | Time | Artist | Album | Owner | Status |
|---|---|---|---|---|---|
| Philosophy | 4:36 | Ben Folds Five | Ben Folds Five | Oombie | Available |
| Underground | 4:11 | Ben Folds Five | Ben Folds Five | djan | Borrowed (See Waiting List) |
| Alice In Wonderland (Take 2) | 8:32 | Bill Evans | Sunday At The Village Vanguard | chreas | Available |
| Run Around | 4:39 | Blues Traveller | Four | djan | Available |
| Most Precarious | 3:27 | Blues Traveller | Straight On Til Morning | eric | Available |
| Optimistic Thoughts | 3:30 | Blues Traveller | Travelers & Thieves | jebbee | Available |
| De Camino a La Vereda | 5:04 | Buena Vista Social Club | Buena Vista Social Club | chreas | Borrowed (See Waiting List) |
| Take Five | 5:26 | The Dave Brubeck Quartet | Time Out | Oombie | Available |
| Stay (Wasting Time) | 5:35 | Dave Matthews Band | Before These Crowded Streets | djan | Available |
| Anta Marching | 4:31 | Dave Matthews Band | Under The Table And Dreaming | alunah | Borrowed (See Waiting List) |
| Lover Lay Down | 5:37 | Dave Matthews Band | Under The Table And Dreaming | Oombie | Available |
| Jim Thing | 5:57 | Dave Matthews Band | Under The Table And Dreaming | Oombie | Available |
| Crash Into Me | 4:16 | Dave Matthews Band | Crash | ckbees | Available |
| Cowboy Take Me Away | 4:47 | Dixie Chicks | Fly | kbryant | Available |
| Landslide | 3:44 | Dixie Chicks | Home | Oombie | Borrowed (See Waiting List) |
| Wide Open Spaces | 3:49 | Dixie Chicks | Wide Open Spaces | djan | Available |
| Ev'ry Time We Say Good-Bye | 3:54 | Ella Fitzgerald | The Cole Porter Songbook (Disc 1) | arverson | Available |
| Change the World | 3:56 | Eric Clapton | Clapton Chronicles | mjordan | Available |
| The Way You Look Tonight | 3:23 | Frank Sinatra | The Very Good Years | aec | Available |
| Your Smiling Face | 3:03 | James Taylor | Live (Disc 1) | Oombie | Available |
| Mexico | 3:32 | James Taylor | Live (Disc 1) | prose | Available |
| Shower The People | 4:43 | James Taylor | Live (Disc 1) | sjohnson | Available |
| Copperline | 4:43 | James Taylor | Live (Disc 2) | bee | Borrowed (See Waiting List) |
| Carolina in My Mind | 5:04 | James Taylor | Live (Disc 2) | djan | Available |
| I Will Follow | 4:14 | James Taylor | Live (Disc 2) | bee | Available |
| Always With Me, Always With You | 3:22 | Joe Satriani | Time Machine | bee | Available |
| Daughters | 3:59 | John Mayer | Heavier Things | jpaulie | Available |
| No Such Thing | 3:51 | John Mayer | Room For Squares | Oombie | Available |
| Why Georgia | 4:28 | John Mayer | Room For Squares | bee | Borrowed (See Waiting List) |

METHOD AND SYSTEM FOR A HOSTED
DIGITAL MUSIC LIBRARY SHARING
SERVICE

CROSS-REFERENCE RELATED APPLICATIONS

This application claims benefit of U.S. provisional patent application Ser. No. 61/020,956, filed Jan. 14, 2008, which is herein incorporated by reference.

FIELD OF THE INVENTION

The present invention relates generally to an architecture for a hosted digital content management service and, more specifically, techniques for sharing digital music among multiple users through a hosted digital music library service.

BACKGROUND OF THE INVENTION

Recent trends in digital music have seen major record labels adopting strategies to offer DRM-free digital music downloads to consumers. As of the end of 2007, all four major record labels (Warner Music Group, Universal Music Group, EMI and Sony BMG) were offering their catalogs of music as DRM-free MP3 downloads through Amazon's online MP3 store. However, the purported "sale" of DRM-free MP3 downloads has been structured as a "clickwrap" license to the MP3 rather than a true sale of a single copy of that MP3 (i.e., similar to the licensing structures used in the software industry). As such, terms of use in the licensing agreement offered by Amazon's MP3 store only provide the purchaser the right to copy, store and transfer the purchased MP3 for personal, non-commercial and entertainment use. Due, in part, to the difficulties in monitoring and policing infringing end user behavior of duplicating and proliferating perfect digital copies of a purchased DRM-free MP3 downloads, actions such as redistribution, transmission, assignment, sale, broadcast, renting, sharing, lending, modifying, adapting, editing, sublicensing are specifically prohibited in such terms.

As of the writing of this application, the legal issue of whether the purported sale of a copy of digital music can be structured as a license of the digital music (i.e., the buyer is a "licensee" rather than an owner and must be bound by any license terms) rather than a true purchase of a copy of such digital music (i.e., the buyer is an "owner" of such copy and is afforded all the legal rights and privileges as an owner) is currently being litigated in UMG Recordings Inc. v. Troy Augusto dba Roast Beast Music Collectables, Case No. 2:07-cv-3106 SJO (AJWx) (C.D. Cal). Nevertheless, to the extent the purchase of DRM-free MP3 downloads is characterized as a true purchase of a copy of such an MP3, the purchaser is afforded rights certain under the "first sale doctrine", which supports the notion that the owner of a legally-acquired copyrighted work is entitled to give or sell that copy to someone else without getting the copyright holder's permission. However, the Record Rental Amendment of 1984 created an exception to the first sale doctrine forbidding owners of copies of "phonorecords", for the purposes of direct or indirect commercial advantage, from renting, leasing, or lending, or by any other act or practice in the nature of rental, lease, or lending. In an environment where DRM-MP3 downloads are characterized as a true purchase of a copy, what is needed is an architecture for an online music service that encourages the legitimate reselling and sharing of DRM-free MP3s (afforded under the first sale doctrine and analogous to traditional used book stores and brick and mortar libraries) that does not run afoul of the Record Rental Amendment of 1984 (e.g., any sharing not done for direct or indirect commercial advantage, etc.) and prevents illegitimate and infringing copying and redistribution.

SUMMARY OF THE INVENTION

The present invention provides a web service architecture that facilitates the sharing of music among subscribers of the web service by leveraging the teachings of first sale doctrine. When the web service receives a request from a subscriber (via interaction through the web) to borrow a song that has been made available to its community of subscribers, the web service copies the digital copy of the request song from the account of the subscriber owning the digital copy into the account of the requesting subscriber. Such a copying action enables the requesting subscriber to access the digital copy of the song, either by streaming the song to the requesting subscriber's own personal computer or by enabling the requesting subscriber to copy the song onto his mobile device. Simultaneously, the web service removes the digital copy from the account of the owning subscriber which thereafter prevents the owning subscriber from accessing that digital copy.

Upon an expiration period of a borrowing period for the song or upon a recall of the digital copy by the owning subscriber, the web service returns the digital copy to the owning subscriber by copying the digital copy from the account of the borrowing subscriber back into the account of the owning subscriber thereby once again enabling access to the digital copy by the owning subscriber. Simultaneously, the web service removes the digital copy from the account of the borrowing subscriber thereby prohibiting access to the digital copy by the borrowing subscriber and preserving rights of the copyright holder to the song.

More generally, the functional components of the hosted web service are herein for facilitating this legitimate sharing of music among subscribers to the web service. As further described in the Detailed Description, such a hosted web service comprises a server comprising (i) a subscriber management platform for managing the digital media content accessible by each subscriber to the web service, (ii) a web server component for serving user interfaces to management digital media content to the subscribers, (iii) an ecommerce store for selling digital media content to subscribers, and (iv) a subscriber sharing component for facilitating the sharing of digital content among subscribers by maintaining only legitimate non-infringing copies of content within the web service for sharing purposes; and a database coupled to the server, the database containing subscriber accounts, wherein each of the subscriber accounts contains subscriber registration information, attributes information relating to digital media content accessible by the subscriber account, and digital content accessible to the subscriber account.

Those with ordinary skill in the art will recognize that technicalities of copying and removing of a digital copy of media to and from different subscriber accounts (e.g., owner and borrower accounts) as described in the foregoing summary may be governed by the operating system and the physical medium in which the digital copy and accounts reside. For example, in certain embodiments, a copy and remove may simply be accomplished through an operating system "move" primitive which adjusts source and target pointers to the memory address where the digital copy is stored on the physical medium such that the digital copy is never deleted from its original memory location.

BRIEF DESCRIPTION OF THE DRAWINGS

FIG. 3 depicts an embodiment of a subscriber music library user interface that may be served by the online music service to a subscriber.

FIG. 4 depicts an embodiment of a community music library user interface that may be served by the online music service to facilitate the sharing of music.

FIG. 8 depicts an embodiment of an update to a borrower's music library user interface to indicate that a selected song has been added.

DETAILED DESCRIPTION OF THE INVENTION

A. Infrastructure Environment

Figure 1:
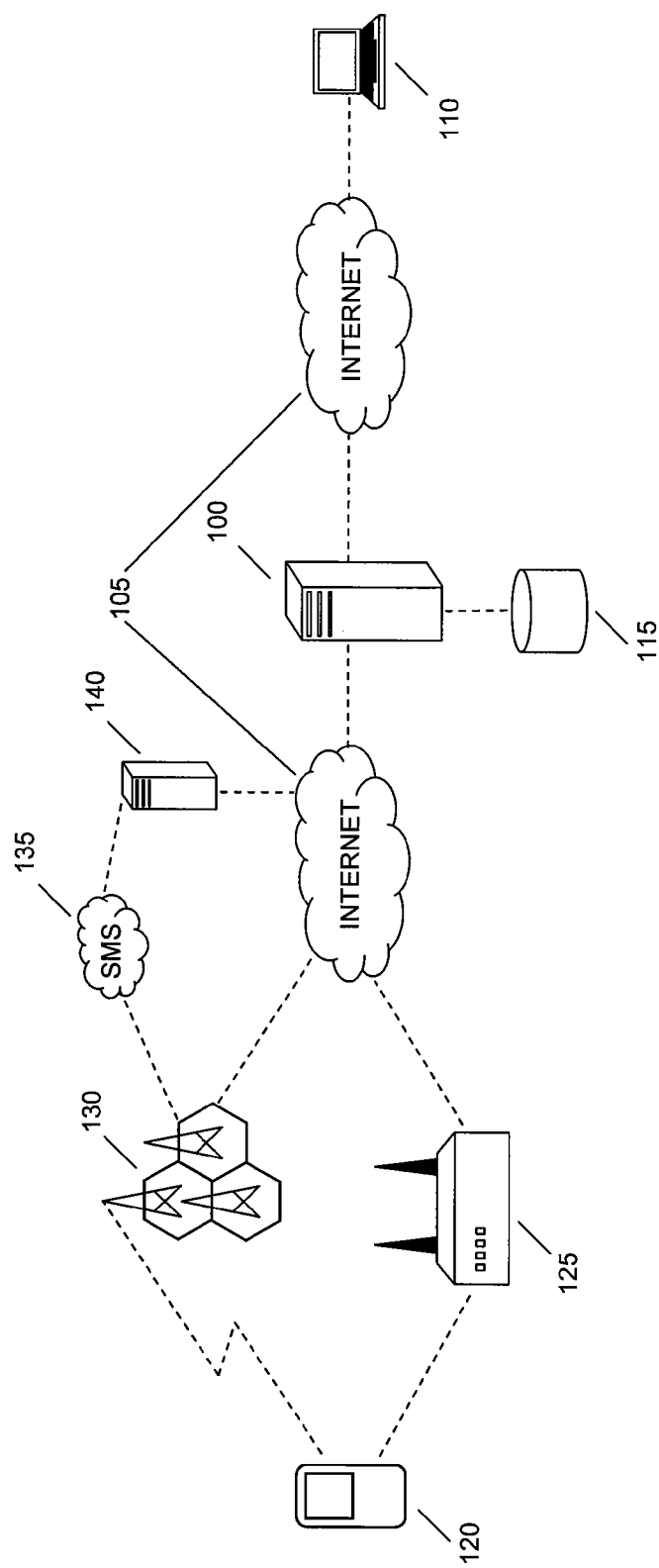
FIG. 1 depicts an embodiment of an infrastructure environment in which an online music service taught herein may be deployed.

FIG. 1 depicts one embodiment of an infrastructure environment in which to deploy an online music service as taught herein. At the heart of the infrastructure environment is a server 100 that hosts the online music service in accordance with the present invention. This online music service server 100 is connected to the Internet 105 such that it can be accessed through the web by end user terminals 110 such as a laptop. The online music service server 100 is also coupled to a subscriber database 115 that stores, in part, subscriber account information and digital music accessible by subscribers of the online music service. Mobile IP-capable devices 120 such as a digital music player or cell phone (with media consumption capabilities) can also access the online music server 100 through the Internet 105. Such a mobile device 120 may connect to the online music server 100 by establishing a connection to a wireless network router such as a WiFi router 125 or through a digital cellular wireless network 130 supporting IP based communications such as 2.5G (e.g., GPRS, EDGE, etc.), 3G (e.g., TD-SCDMA, CDMA2000, etc.), 3.5G (e.g., HSDPA/UMTS) and future generations of packet-switched cellular wireless technologies. A current commercial example of a mobile device 120 that might be used in accordance with the present invention could be Motorola's RAZR cell phone which supports cellular communication technologies and includes an embedded digital music player application. Those mobile devices (e.g., cell phones, etc.) that utilize the digital cellular wireless network 130 may also support text messaging services such as SMS (Short Message Service) 135 that can be used by the online music service server 100 to initiate communications with the mobile device 120. For example, the online music service server 100 may interact with an SMS gateway 140 through the Internet 105 to send SMS messages to the mobile device 120.

Figure 2:
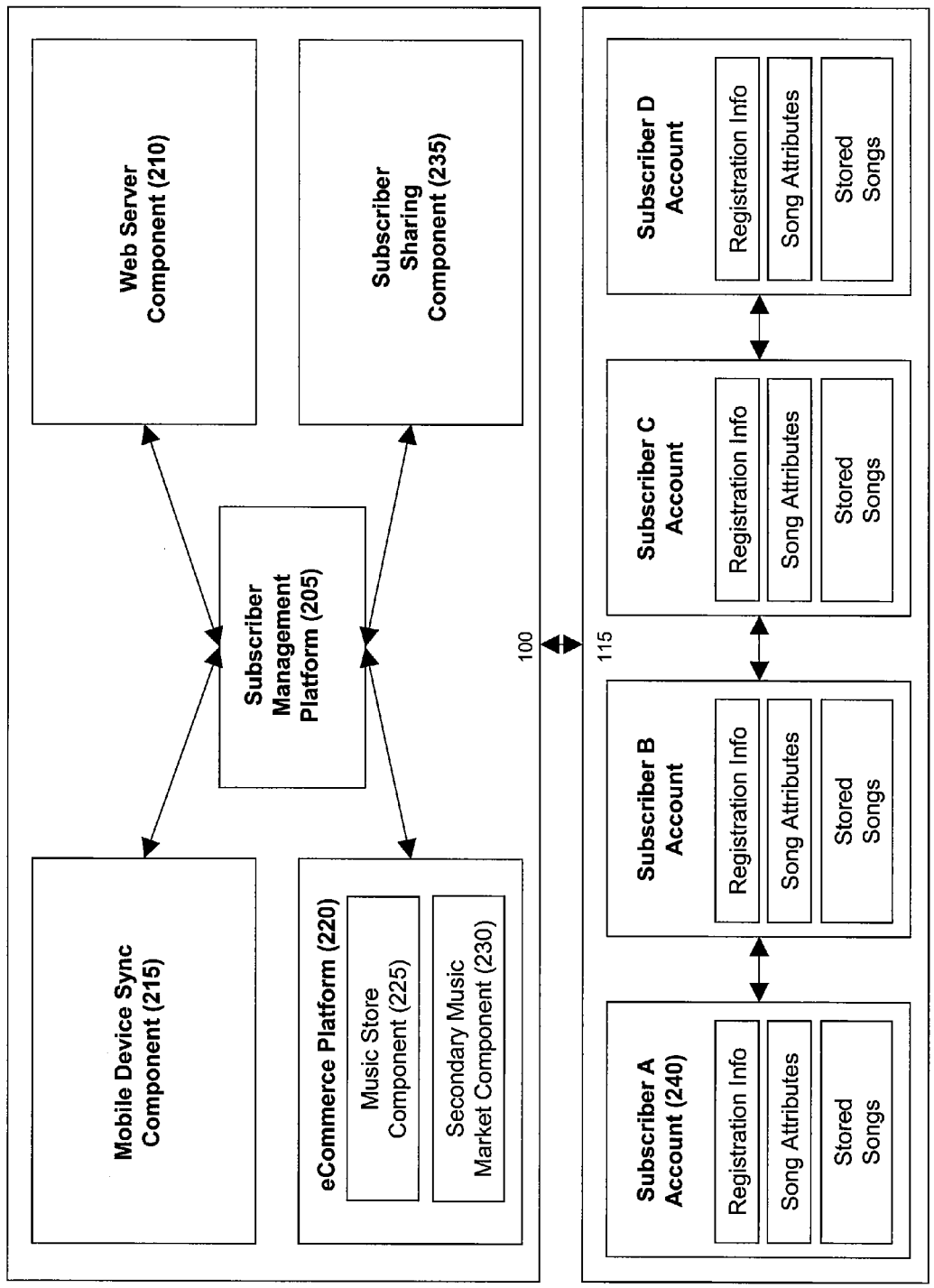
FIG. 2 depicts an embodiment of an internal component architecture of the online music service.

FIG. 2 depicts one embodiment of an internal functional component architecture of the online music service implement at server 100 and database 115. At the center of server 100 is the subscriber management platform 205 which manages subscriber account information, interacts with the database and serves as a centralizing hub for other components within server 100. One such component that is coupled to platform 205 is the web server component 210 which serves web page user interfaces to a subscriber to manage his music activities, as further detailed in Section B below. Another component is the mobile device synchronization component 215 which enables online music service to communicate with a subscriber's mobile device 120 to add and remove music on the device, as further detailed in Section E below. Certain embodiments of the online music service taught herein may also have an ecommerce platform 220 that provides subscribers the ability to purchase music (e.g., DRM-free MP3 tracks, etc.) which are then automatically stored in the subscribers' account in database 115. In addition to a traditional music store component 225 (similar to Amazon's MP3 digital music portal or other online music stores known to those of ordinary skill in the art), certain embodiments of the online music service taught herein may also have a secondary music market component 230 (further described in Section F) that takes advantage of the first sale doctrine of copyright law and empowers subscribers to resell digital music they have legitimately purchased through the traditional music store component 225. Subscriber sharing component 235 is coupled to the subscriber management platform 205 and manages and monitors the sharing of music among the subscribers as further detailed in Section C. Database 115 keeps track of subscribers' accounts such as 240, which may contain registration information (e.g., personal and demographic information, etc.), an index of the attributes of songs currently accessible by the subscribers' account, and storage of the such accessible music.

As used hereinafter, the term and reference number "server 100" may be used generally to refer to the server side capabilities (as opposed to the client side capabilities, for example, at the mobile device 120 or end user terminal 110) and therefore may include functionality resident in the database 115 as the context requires. Those with ordinary skill in the art will also recognize that for certain embodiments, server 100 may be representative of multiple networked computers and processors that can be considered a single logical entity that provides the functionality in server 100 as described herein. Similarly, those with ordinary skill in the art will recognize that the functional components in FIG. 2 are merely exemplary and that other components and configurations that provide substantially similar functionality to that of the functional components in FIG. 2 can be used consistent with the spirit and scope of the invention. For example, while the subscriber management platform 205 is set logically apart from the other components, those with ordinary skill in the art will recognize that such separation is for logical discussion purposes only and that actual code implementations of the foregoing may not necessarily utilize such logical distinctions. In one exemplary configuration, web server component 210 containing the web server functionality described herein, the subscriber management platform 205 and other components described in the foregoing may be implemented as Java servlets that interact with a web server supporting servlet technology such as Apache Tomcat. Similarly, those with ordinary skill in the art will also recognize that database 115 may utilize a variety of known database platforms or technologies (e.g., MySQL, etc.) or may be implemented programmatically through data that is statically embedded in various source code files. Those with ordinary skill in the art will also recognize that any IP-capable device (i.e., not just mobile devices such as 120) may be used in an infrastructure environment described in FIG. 1 without departing from the spirit of the present invention. Those with ordinary skill in the art will also recognize that the traditional music store component 225 may be offered by interacting with a third party service provider such as Amazon or any other digital content reseller known to those with ordinary skill in the art.

B. User Interface

Figure 3:
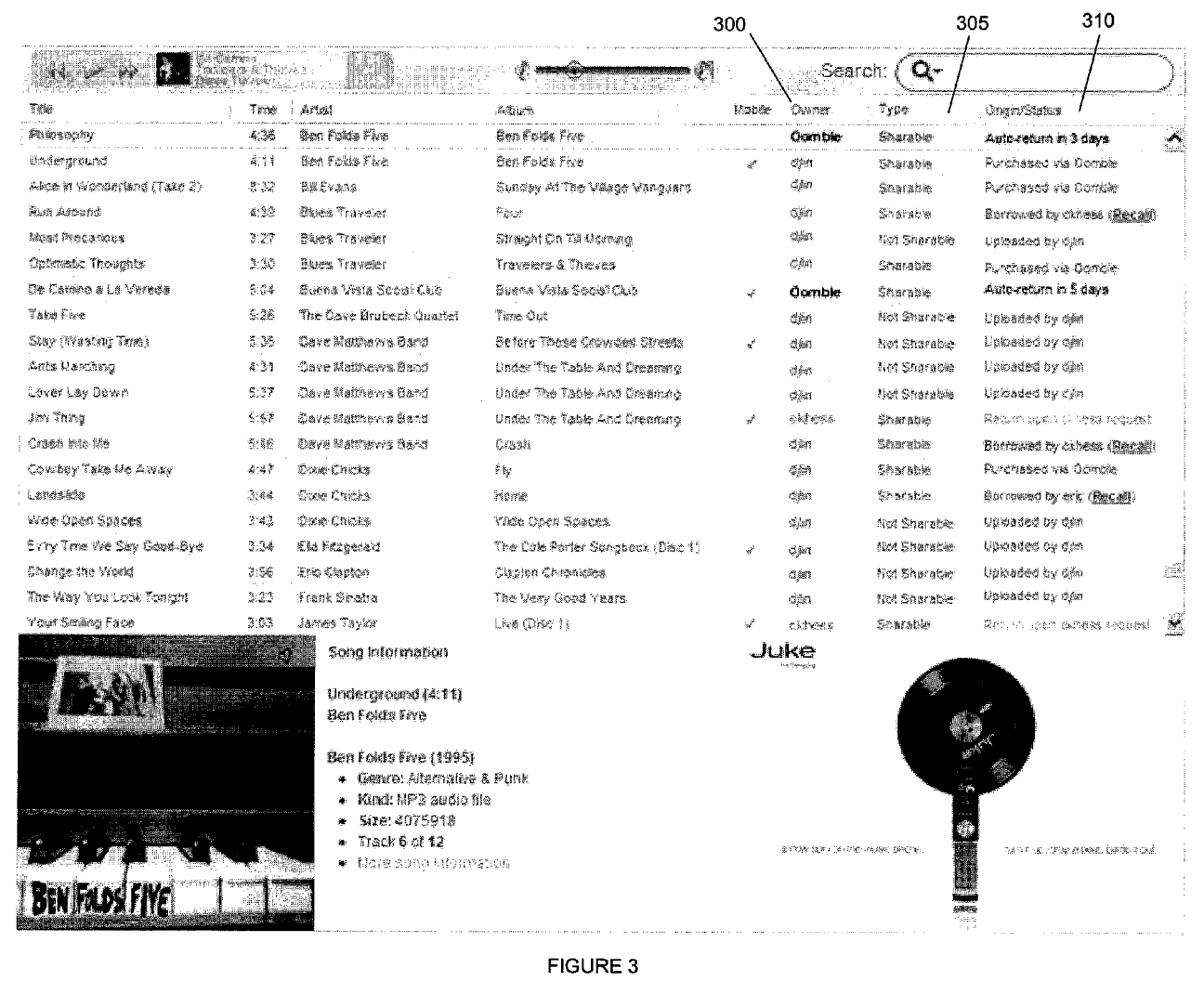

FIG. 3 depicts one embodiment of a subscriber music library user interface that may be served by the online music service server 100 to the web browser of a subscriber's terminal 105. When a subscriber of the online music service logs into his prior registered account on server 100, a web page including the interface of FIG. 3 is served by the server's web server component 210 to the subscriber. As shown in FIG. 3, the user interface displays a list of songs stored in the subscriber's account at server 100, each of which can be selected and streamed to the subscriber's terminal 105 or copied to and then played on the subscriber's mobile device 120. Similar to other current digital music player applications or services (e.g., iTunes, RealPlayer, Napster, etc.), the user interface of FIG. 3 displays the name of the songs, artists, albums, cover art and other useful information for the songs stored in the subscriber's account. However, unlike other music services, the songs stored in the subscriber's account at server 100 are not necessarily owned by that subscriber, himself, but may be borrowed by that subscriber from other subscribers or the online music service itself (as further explained below). As such, the user interface of FIG. 3 also displays the actual owner of each song in the subscriber's account (see column 300). Further, the subscriber's may choose to enable sharing a certain subset of his own songs with other subscribers (as further explained below) depending upon how the subscriber's list of songs were added into the online music service (e.g., uploaded, purchased, etc.) (see columns 305). Given the online music service's capability to share music among subscribers, the user interface of FIG. 3 also displays the current status of a subscriber's list of songs to indicate, for example, whether a particular song is currently borrowed by another subscriber or must be returned to another subscriber, etc.

In addition to displaying a list of songs stored in the subscriber's own account, in certain embodiments, a subscriber is able to also view a general list of songs that have been provided by other subscribers of the service for sharing purposes. FIG. 4 displays one embodiment of a view of such a community list of songs. Column 400 displays the owner of each listed song—some songs are owned by subscribers while other songs are owned by the online music service itself (called "Oomble" in FIG. 4). Column 405 additionally displays whether the song is currently available to be borrowed by a subscriber. Specifically, a song that is currently being borrowed by a particular subscriber cannot be borrowed by another subscriber until the song is returned back to the owner.

Figure 5:
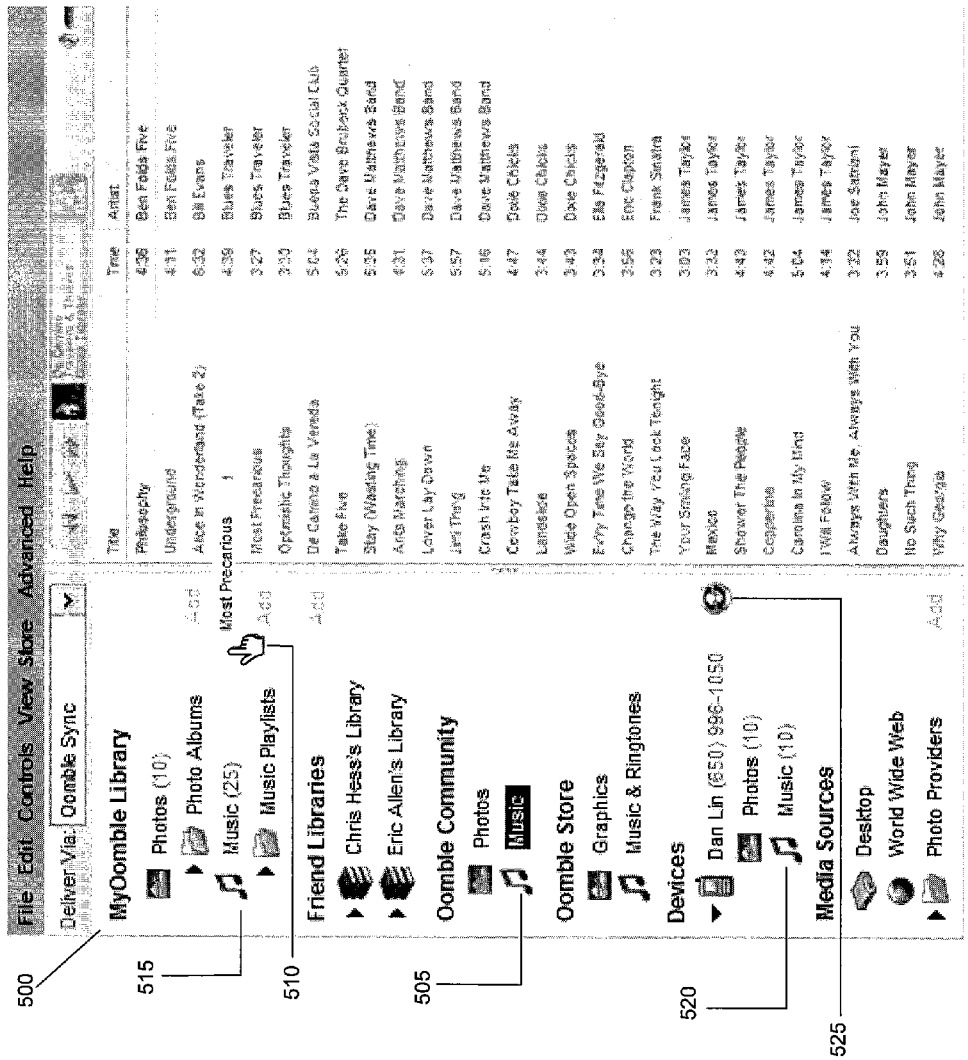
FIG. 5 depicts an embodiment of a subscriber music management user interface that may be served by the online music service.

FIG. 5 depicts one embodiment of a view and management window 500 that is displayed to a subscriber when he logs into the online music service. As FIG. 5 shows, the community list of songs in FIG. 4 is displayed to the right of the view and management window 500 because the "Oomble Community" music line item in window 500 has been highlighted by the logged in subscriber at 505. In order to borrow an available song from the community list, a subscriber selects the song and drags and drops it (as shown in 510) into his own music library at 515. Those with ordinary skill in the art will recognize that FIGS. 3 to 5 are merely exemplary of numerous ways to display music stored on the server 100 that remain consistent with the spirit and scope of the present invention.

C. Sharing Stored Music

One important aspect of the online music service taught herein is the ability for subscribers to the service to share or borrow music stored on server 100. Consistent with the first sale doctrine and similar in manner to borrowing books at a traditional brick and mortar library, the online music service taught herein enables owners of legitimately obtained copies of music to share such music amongst other subscribers. In order not to run afoul of the Record Rental Amendment of 1984, such sharing should not be done for "purposes of direct or indirect commercial advantage." Subject to certain restrictions depending upon how a subscriber loads music into database 115 (e.g., purchased through the online music service's music store or uploaded independently by the subscriber, etc.), subscribers can choose to selectively share their music with specific friends or with the community at large.

Figure 6:
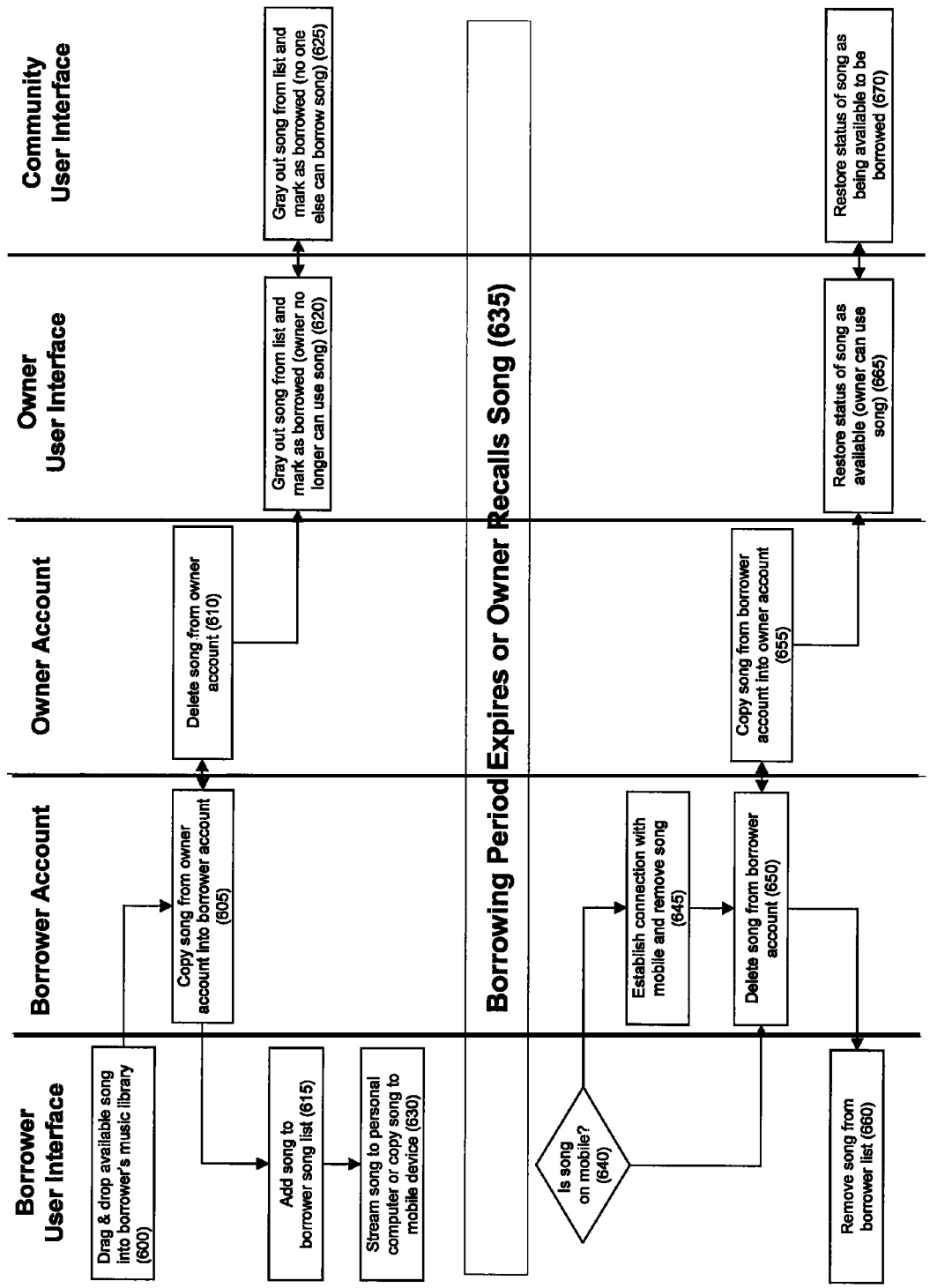
FIG. 6 depicts an embodiment of a flow of steps to obtain and return a song from the community.

FIG. 6 depicts a flow of the steps that occur within the online music service after a subscriber has moved a song from the community song list into his own list of songs (i.e., his music library). In step 600, the subscriber-borrower drags and drops an available song from the community song list into his own music library 515. In steps 605 and 610, the online music service moves the actual song file (e.g., DRM-free MP3 file) from the song owner's music storage area in database 115 to the subscriber's (hereinafter, also referred to as the "borrower") music storage area in database 115. Such a "move" of the song file causes it to be deleted or removed from the song owner's account and added to the borrower's account such that only one copy of the song continues to persist within the database 115 thereby preventing any copyright infringing replications of the song. The result of such a move of the song file is that, until the borrowing period has ended and that song has been returned to the owner's storage area, the owner can no longer listen to the song streamed through the user interface of FIG. 3 or move the song onto the owner's mobile device 120. From a user interface update perspective, the borrowed song is now added to the borrower's list of songs in step 615, is grayed out in the owner's list of songs (indicating that it is no longer available to be listened to by the owner) in step 620 and grayed out in the community list of songs (indicating that it is no longer available to be borrowed) in step 625. Once the song has been added to the borrower's song list in step 615, the borrower is now able to stream the song to his personal computer or move the song to his mobile device in step 630.

Depending upon the particular embodiment of the online music service, the owner of a song can choose to set a specific borrowing period for borrowed songs owned by him or can simply request immediate recall of the song when he desires such a song to be returned back to him. Once the borrowing period expires or the owner recalls the song at step 635, the borrowed song is returned to the owner. At step 640, if the borrower has moved a copy of the song onto his mobile device, the song is removed from the mobile device by establishing a connection with the mobile device and removing the song in step 645 (see Section E below for further details). In step 650, the song is removed from the borrower's account and restored to owner's account in step 655. From a user interface update perspective, once the song is removed from the borrower's account in step 650, it is removed from the borrower's user interface in step 660. Similarly, the song is restored in the owner's user interface at step 665 and set once again as available in the community user interface at step 670.

Figure 7:
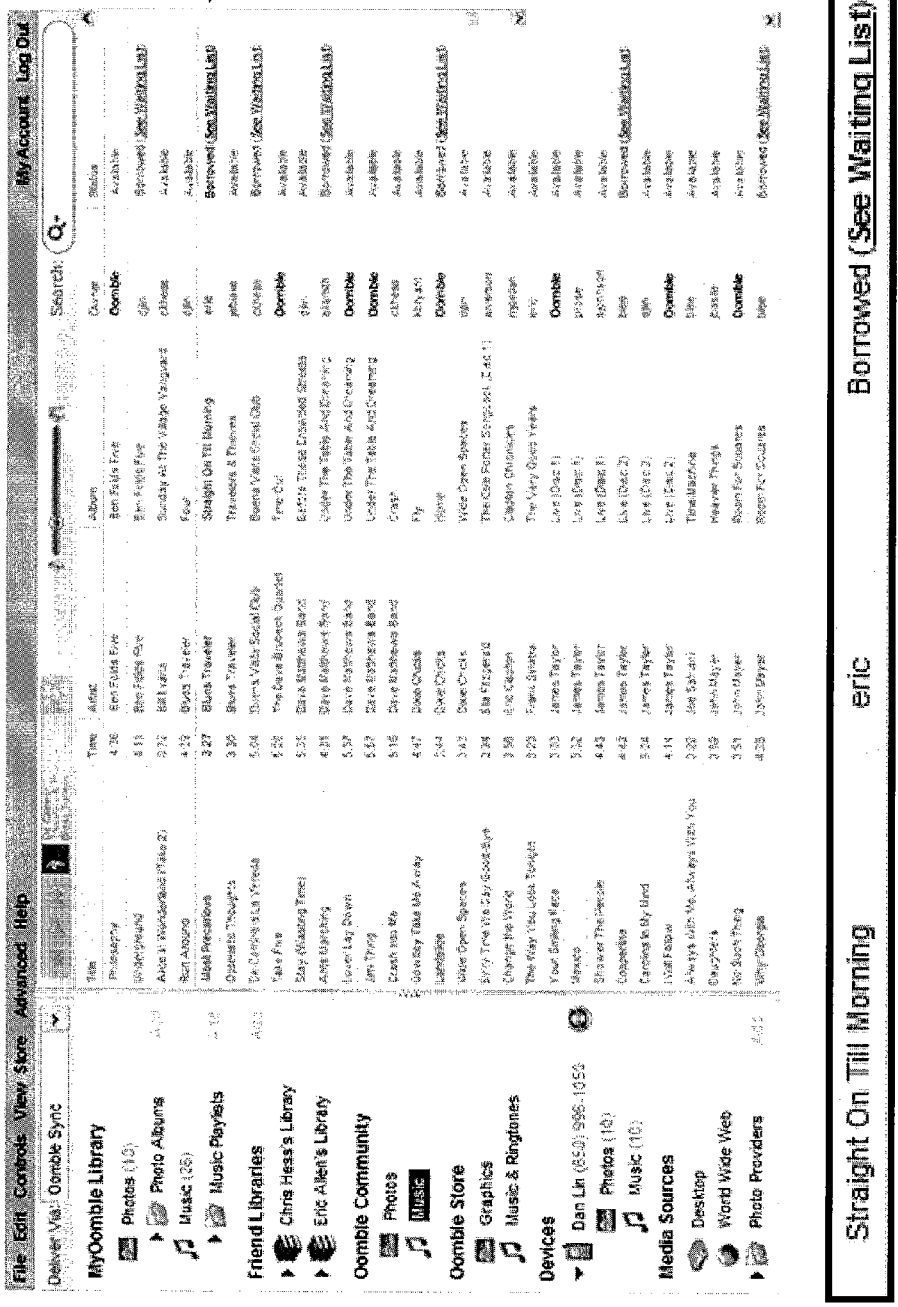
FIG. 7 depicts an embodiment of an update to the community music library user interface to indicate that a selected song is borrowed.
Figure 8:
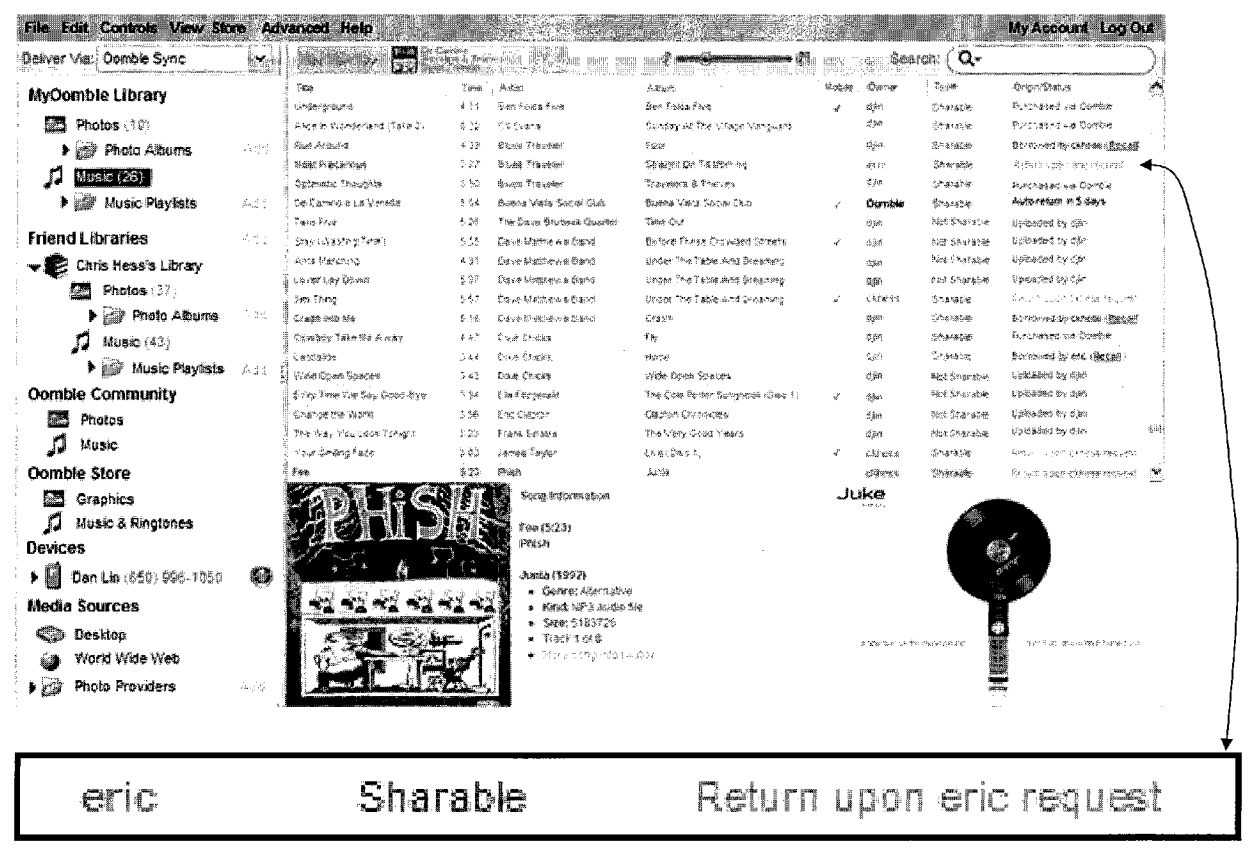
Figure 9:
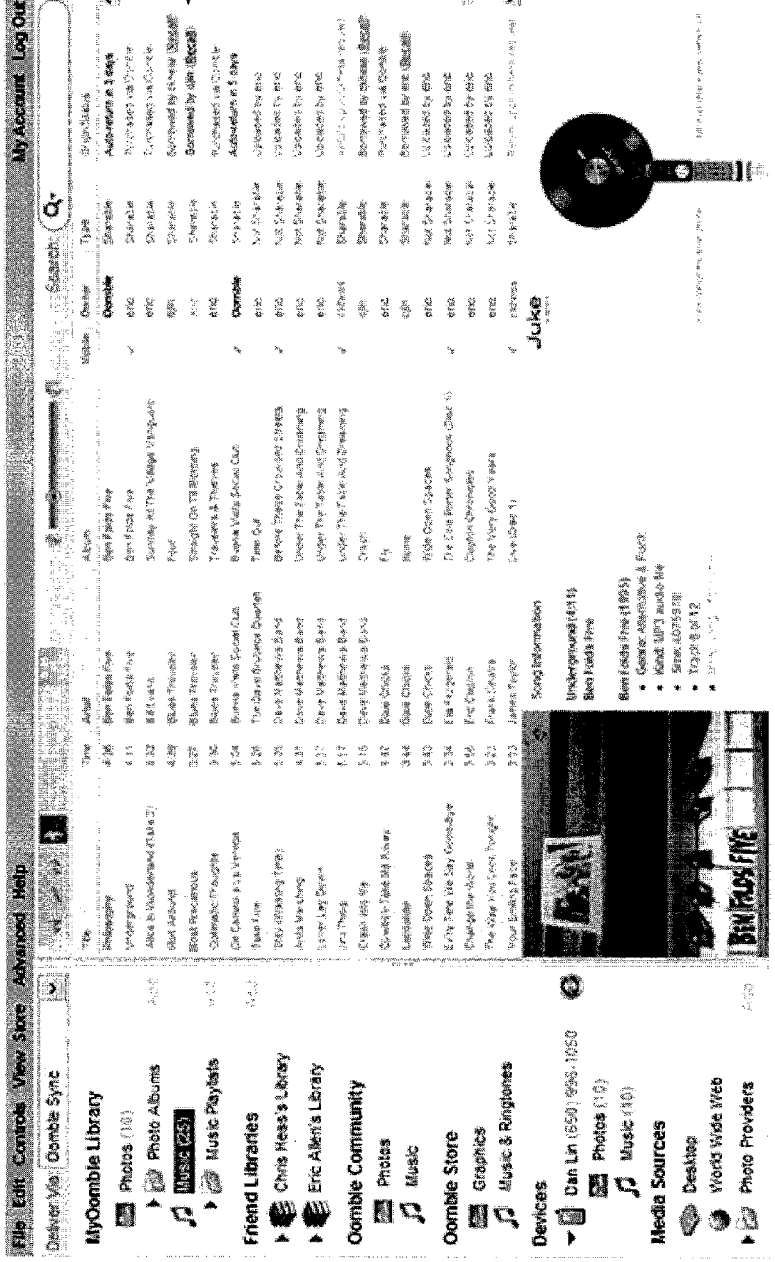
FIG. 9 depicts an embodiment of an update to a song owner's music library user interface to indicate that a selected song has been borrowed.

As described above and as shown in the particular embodiments of FIGS. 7 to 9, the information in the song list views of the community, owner and borrower change to reflect the movement of the song from the owner's account to the borrower's account. FIG. 7 depicts the community song list view and the update of the status of the moved song from "Available" to "Borrowed." As can be seen, the moved song entry is also grayed-out in the community view to indicate that it is no longer available to be borrowed by other subscribers. FIG. 8 depicts the borrower's song list view and the addition of the moved song into the borrower's song list. In the particular embodiment of FIG. 8, the song owner has set the borrowing parameters of the moved song such that the borrower can keep the song indefinitely until the owner requests its return—as such, the status of the song in the borrower's song list notes that the song will be returned upon the owner's request. FIG. 9 depicts the owner's song list view and shows that the moved song is now grayed-out in the owner's view and notes that the borrower is now in possession of the moved song. As FIG. 9 depicts, the owner is able to "recall" the song at anytime but until the song is recalled, the owner is unable to listen to it or move it to his mobile device.

Those with ordinary skill in the art will recognize that FIGS. 7 to 9 are merely exemplary of numerous ways to display music stored on the server 100 that remain consistent with the spirit and scope of the present invention. Similarly, those with ordinary skill in the art will recognize that the storage and movement of music in database 115 in and among different subscriber accounts can be accomplished in a variety of technical methodologies and data structures. For example, rather than a true deletion of the song when moving the song from one subscriber account to another subscriber account, one embodiment may simply change the pointers (e.g., delete or remove owner's pointer and add borrower's pointer) that are associated with the address of the stored song in memory. Certain embodiments may also provide the capability to establish private communities of friends (e.g., through friend request invitations similar to those used in Facebook and other online social networks known to those with ordinary skill in the art) that share music in addition to or in replacement of the general online music service community as described herein. Additionally, in certain embodiments, the movement of songs in certain embodiments may not always be moved between the owner and a first borrower of music; that is, music borrowed by a first borrower may be further recursively borrowed by subsequent borrowers directly from the first borrower, depending upon the borrowing parameters set up by both the owner and the first borrower.

D. Characteristics of Stored Music

Figure 10:
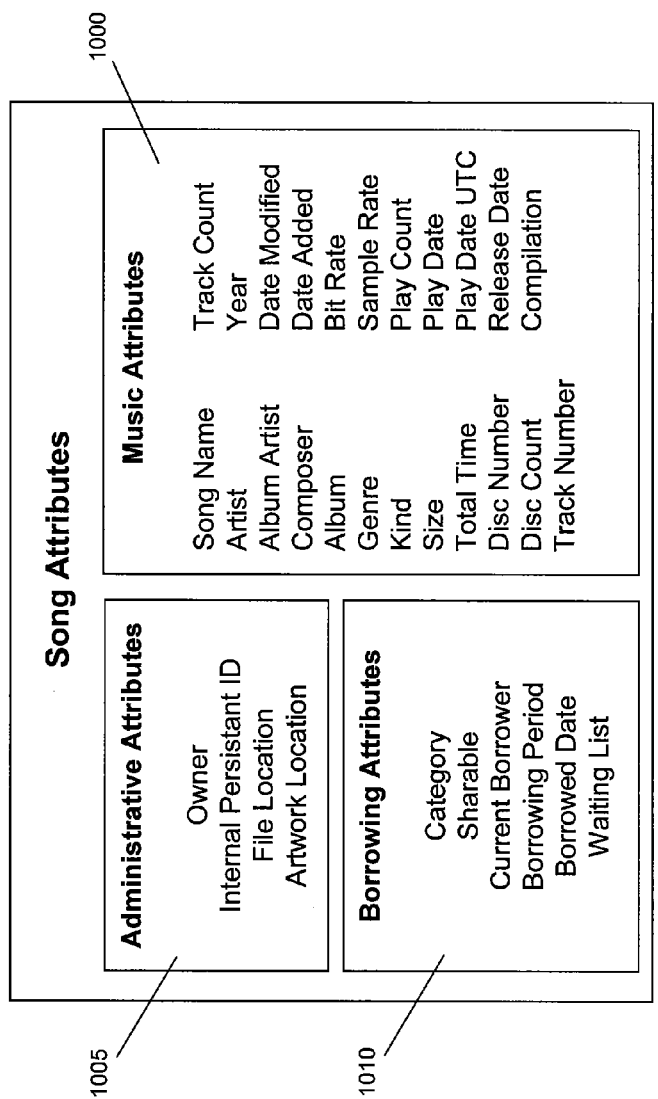
FIG. 10 depicts an embodiment of a data structure of the attributes associated with a song stored in the online music service.

FIG. 10 depicts one embodiment of a data structure record for a song stored within the online music service in database 115. In addition to the standard music attributes stored in 1000 as known to those with ordinary skill in the art, the data structure of FIG. 10 further maintains administrative attributes 1005 of the song which include the owner of the particular copy of the song associated with the record. Additionally, the data structure also maintains 1010 borrowing attributes of the song that enable the online music service to keep track of information needed to share stored music among subscribers as detailed in Section C.

In order to prevent copyright infringement issues, not all music that is stored in a subscriber's account in database 115 are permitted to be shared amongst the subscribers. The online music service taught herein maintains a closed structure from a song copying perspective such that illegitimate copies cannot be shared among its subscribers. So long as the online music service can verify that a subscriber has not made copies of a legitimate copy of a song, such as song can be shared within the community. However, the ability to verify that there are no illegitimate copies depends on the online music service's tracking of the origin and subsequent access to songs stored within database.

Figure 11:
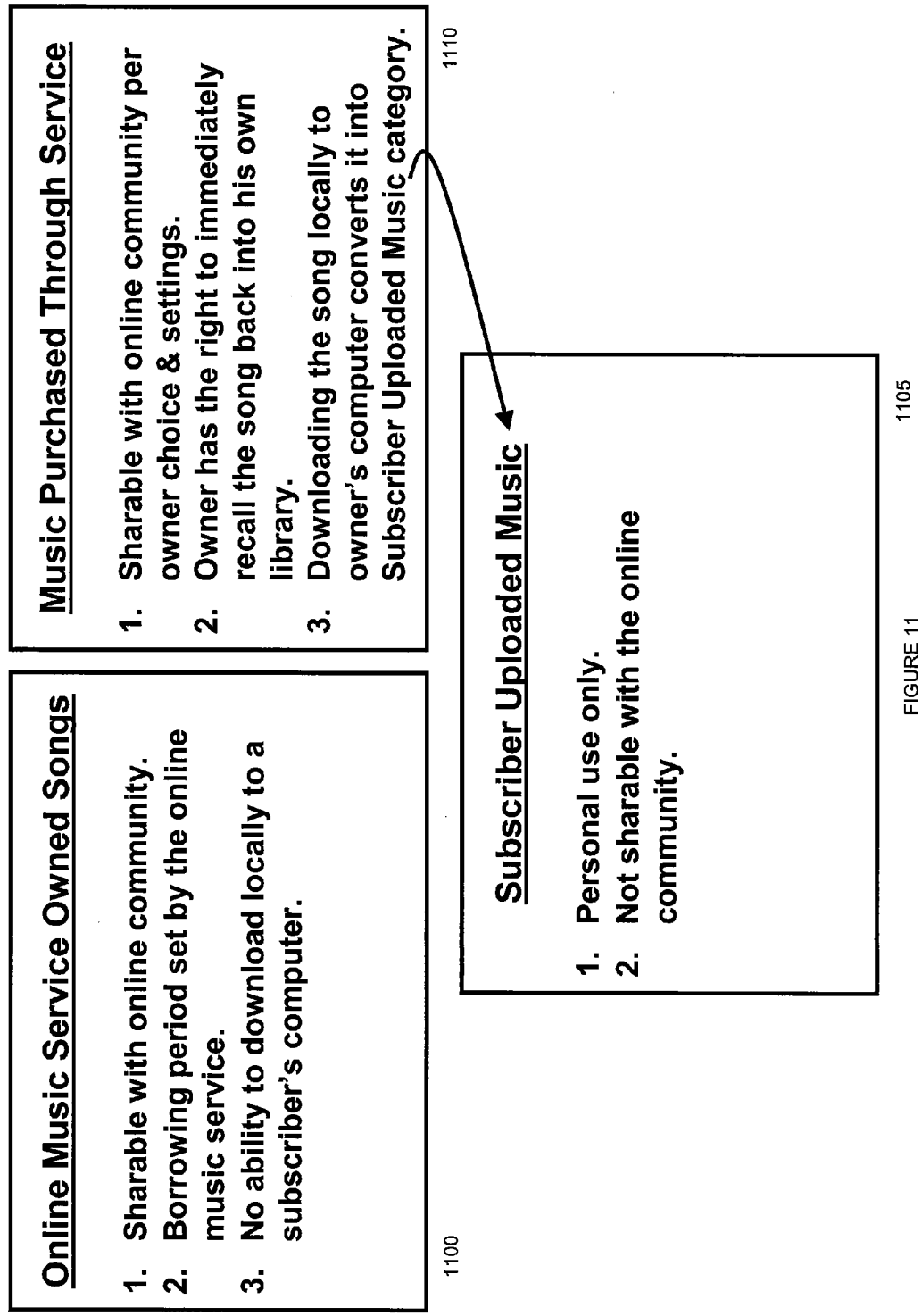
FIG. 11 depicts an embodiment of the categories of music in the online music service and the different characteristics associated with such categories.

FIG. 11 depicts the different categories of songs in an embodiment of the online music service and the characteristics associated with such categories. Category 1100 of FIG. 11 represents those legitimate copies of songs that are purchased and owned by the online music service itself. These songs are shared among subscribers and help to jumpstart sharing of subscribers' own songs within the community. Depending upon the embodiment of the online music service, such songs may have a set borrowing period (e.g., 2 weeks, etc.) as set by the online music service. Alternative embodiments may, for example, enable a first borrower to keep a borrowed song in his own library until other subscribers indicate a desire to borrow such a song (e.g., by getting on a waiting list for the song, etc.) before the borrowing period starts. Unlike other categories, songs owned by the online music service cannot be downloaded by subscribers to their own personal computers because once a subscriber downloads a song, the online music service can no longer verify whether illegitimate copies of the downloaded song have been locally made by subscriber on his personal computer such that sharing the song with other subscribers within the online music service no longer prevents the subscriber who downloaded the song from accessing the song.

Category 1105 represents songs that are uploaded by subscribers into their accounts in the online music service (e.g., database 115). Because the online music service cannot readily verify the legitimacy of the song copy or whether multiple copies of the songs are held by the subscriber prior to uploading, these songs in this category are not sharable with other subscribers. Category 1110 represents songs that have been purchased by subscribers through the music store component 225 of the online music service itself. Upon purchase, these songs are automatically placed within the account of the purchasing subscriber and the subscriber may elect to share such songs with the community. As the owner of the song, the subscriber has the right to recall the song for his own personal use at anytime thereby causing the song to be removed from a borrower's account and restored into the subscriber's own account. The owner further has a right to download such a purchased song locally to his laptop 110 to use outside of the online music service taught herein (e.g., play on a local music application such as iTunes, RealPlayer, etc.). However, if a subscriber chooses to download the song to his laptop for such further personal use outside of the online music service, the song is no longer sharable within the online music service because the online music service can no longer control proliferation of copies of the song by the subscriber outside of the online music service (i.e., such that the sharing of songs within the service would no longer preclude the subscriber's ability to retain a copy of the song outside of the system for personal use).

E. Synchronization with Mobile Devices

As previously discussed in the context of FIGS. 1 and 2, certain embodiments of the online music service taught herein enable a subscriber to move music from his music account into his mobile device 120 such as a cell phone. As shown in FIG. 5 at 520, a subscriber is able to simply drag and drop available songs into his mobile device 120 through the management user interface and initiate a synchronization process in order to copy such songs on the mobile device 120.

One exemplary embodiment that implements such a synchronization process with a cell phone as mobile device 120 utilizes a "thin client" application installed on the subscriber's cell phone 120 similar to the thin client application described in U.S. patent application Ser. No. 11/674,081 filed Feb. 12, 2007, entitled "Method and System for a Hosted Mobile Management Service Architecture" (hereinafter "Synchronization Application") which is hereby incorporated by reference. In such an embodiment, when the subscriber clicks on the synchronization button (see 525 in FIG. 5), any dragged songs that have been queued in 520 for delivery to the cell phone 120 are fetched by server 100 and transmitted to the cell phone 120. Specifically, as further detailed in the Synchronization Application, the thin client application receives communications from server 100 through the cellular network and interacts with the cell phone's file system. Depending upon the user's cell phone model and carrier, server 100 transmits to the thin client application the correct sequence of "primitives" or file system operations that enables the thin client application to store the dragged songs in the correct location in the file system of the cell phone 120 to be consumed by the phone's native music player application. In particular, when the user completes dragging desired songs into his cell phone 120, server 100 adds all such songs to the cell phone. By first transmitting an SMS push message to the push registry of the cell phone 120 by communicating with the SMS gateway 140, server 100 activates the thin client application which then initiates communication back to server 100 to receive and perform all the changes to content on the cell phone 120 made by the subscriber through his user interface (e.g., FIG. 8). Once the thin client completes its activities, the subscriber is able to access the native music player application of the cell phone in order to listen to the new songs transferred onto the cell phone 120 through the subscriber's user interface on the web.

As described in step 645 of FIG. 6, when a song's borrowing period has expired or the owner has recalled the song, the song is removed from a borrower's mobile device 120. With a cell phone 120 utilizing a thin client application as described in the Synchronization Application, the online music service delivers an SMS push message to the push registry of the cell phone 120 to activate the thin client application which then initiates communication back to server 100 to receive the deletion instruction from the online music service and execute the deletion of the song from the cell phone 120. Those with ordinary skill in the art will recognize the existence alternative client-server architectures to add and remove shared music from mobile device 120. For example, alternative embodiments may have persistent (i.e., continually running in the background) client applications on mobile devices 120 (which utilize either a WiFi connection 125 or cellular connection 130) that continually poll and/or communicate the online music service for updates such as song addition and deletion instructions. Alternatively, richer client applications may offer their own music player application and can additionally keep track of borrowing periods for borrowed songs and automatically delete expired songs on the mobile device without necessarily communicating with server 100.

F. Secondary Market for Music

As discussed in the context of 230 of FIG. 2, certain embodiments of the online music service taught herein may also support the ability of subscribers to resell certain copies of music within their accounts. Specifically, songs purchased through the music store component 225 of the online music service (i.e., Category 1010 of FIG. 10) can be resold at a price specified by the purchaser because the online music service can move the purchased copy of the song from the purchaser's account to a second buyer's account with the assurance that no illegitimate copies of the song would have been made by the original purchaser. Such a secondary market is implemented in 230 of FIG. 2. Unlike sharing, the reselling of a purchase copy of a song is not subject to the Record Rental Amendment of 1984. Pursuant to the first sale doctrine, once a subscriber has purchased and owns a copy of a song from the music store component 225, that subscriber has the right to resell that copy of the song. Upon a successful resale transaction with another subscriber, the online music service moves the copy of the song from the seller-subscriber account into the buyer-subscriber account in database 115. The owner attribute in the administrative attributes of 1005 in FIG. 10 is updated to reflect the new owner of the song after the resale transaction and the new owner can stream the song, move the song to his mobile device 120 or share the song with the community as previously discussed herein.

G. Alternative Embodiments

While the present invention has been primarily described with music as the media that is managed by the online service implemented in server 100, those of ordinary skill in the art will recognize that alternative media and embodiments may be implemented without departing from the spirit and scope of the claimed invention. Other forms of digital media and data such as video, images, photos, podcasts, etc. may also be managed through a web-enabled server in accordance with the techniques described herein. Although the present invention has been described with reference to alternative embodiments, those of ordinary skill in the art will recognize that changes may be made in form and detail without departing from the spirit and scope of this disclosure.

Those of ordinary skill in the art will additionally recognize that the control logic and data stored and used by the various functional components and data structures as described in the foregoing specification are merely illustrative and may be redistributed through various other logical components and data structures in alternative but functionally equivalent designs, including the removal of certain software components and/or databases, without departing from the scope or spirit of the described embodiments. Terminology used in the foregoing description is for the purpose of describing the particular versions or embodiments only, and is not intended to limit the scope of the present invention which will be limited only by the appended claims. As used herein and in the appended claims, the singular forms "a," "an," and "the" include plural references unless the context clearly dictates otherwise. Similarly, the words "for example", "such as", "include," "includes" and "including" when used herein shall be deemed in each case to be followed by the words "without limitation." Unless defined otherwise herein, all technical and scientific terms used herein have the same meanings as commonly understood by one of ordinary skill in the art. All publications mentioned herein are incorporated by reference. Nothing herein is to be construed as an admission that the embodiments disclosed herein are not entitled to antedate such disclosure by virtue of prior invention. Thus, various modifications, additions and substitutions and the like can be made without departing from the spirit of the invention and these are therefore considered to be within the scope of the invention as defined in the following claims.

What is claimed is:

1. A computer-implemented method performed by a server hosting a web service for sharing a digital copy of media with a borrower, wherein the digital copy is stored in association with an account of an owner of the digital copy of the media in a media storage database coupled to the server, the method comprising:
   receiving a request to borrow the digital copy from the borrower;
   verifying that the digital copy was purchased by the owner through an ecommerce store component of the web service and has not been downloaded to a personal computer by the owner;
   if the verifying step determines that the digital copy was not purchased by the owner through the ecommerce store component or that the digital copy has been downloaded to the personal computer, denying the request to borrow the digital copy; and
   if the verifying step determines that the digital copy was purchased by the owner through the ecommerce store component and has not been downloaded to the personal computer, copying the digital copy from the account of the owner into an account of the borrower thereby enabling access to the digital copy by the borrower through the web service, and removing the digital copy from the account of the owner thereby prohibiting access to the digital copy by the owner.

2. The method of claim 1 further comprising the following steps upon and occurrence of a return event for the digital copy:
   copying the digital copy from the account of the borrower into the account of the owner thereby enabling access to the digital copy by the owner through the web service; and
   removing the digital copy from the account of the borrower thereby prohibiting access to the digital copy by the borrower.

3. The method of claim 2 wherein the return event for the digital copy is selected from the group consisting of a recall request of the digital copy by the borrower and an expiration of a borrowing period associated with the digital copy.

4. The method of claim 2 further comprising the steps of:
   establishing a network connection with a mobile device of the borrower; and
   removing the digital copy from the mobile device.

5. The method of claim 2 wherein the step of copying the digital copy from the account of the borrower is implemented by adding a pointer associated with the account of the owner to the memory address of the digital copy and the step of removing from the account of the borrower is implemented by deleting a pointer associated with the account of the borrower to the memory address of the digital copy.

6. The method of claim 2, further comprising the steps of:
   downloading the digital copy to the personal computer of the owner; and
   marking the digital copy as not sharable.

7. The method of claim 1 further comprising the steps of:
   if access to the digital copy has been enabled for the borrower, establishing a network connection with a mobile device of the borrower; and
   downloading the digital copy into the mobile device.

8. The method of clam 1 wherein the step of copying is implemented by adding a pointer associated with the account of the borrower to the memory address of the digital copy and the step of removing is implemented by deleting a pointer associated with the account of the owner to the memory address of the digital copy.

9. The method of claim 1 wherein the digital copy of media is a DRM-free MP3 file.

10. A hosted web service for sharing digital media content among subscribers to the web service, the service comprising:
   a server comprising (i) a web server component for serving user interfaces to manage digital media content and receiving a borrowing request to borrow a digital copy of media from a subscriber, (ii) an ecommerce store for selling digital media content to subscribers, and (iii) a subscriber sharing component for permitting the borrowing request by verifying that the digital copy was purchased by an owner of the digital copy through the ecommerce store and was not downloaded to a personal computer by the owner and denying the borrowing request if the digital copy was not purchased by the owner through the ecommerce store component or if the digital copy has been downloaded to the personal computer, denying the request to borrow the digital copy; and
   a database coupled to the server, the database comprising subscriber accounts, wherein each of the subscriber accounts contains subscriber registration information, attributes information relating to digital media content accessible by the subscriber account, and digital content accessible to the subscriber account.

11. The web service of claim 10 wherein the subscriber sharing component further comprises programming instructions to, upon receiving the borrowing request, (i) copy the digital copy into an account of the subscriber and (ii) remove the digital copy from an account of the owner of the digital copy such that the subscriber has access to the digital copy and the owner has no access to the digital copy.

12. The web service of claim 11 wherein the programming instructions to copy the digital copy into the account of the borrowing subscriber adds a pointer associated with the account of the borrowing subscriber to the memory address of the digital copy and the programming logic to remove the digital copy from the account of the owner deletes a pointer associated with the account of the owner to the memory address of the digital copy.

13. The web service of claim 10 wherein the ecommerce store further comprises a secondary media market component to facilitate reselling of digital media content owned by subscribers to the web service and purchased through the ecommerce store.

14. The web service of claim 10 wherein the server further comprises a mobile device synchronization component for copying digital media content to subscriber mobile devices.

15. A non-transitory computer-readable storage medium including instructions that, when executed by a processor of a computer system, causes the processor to facilitate the sharing of digital media content among subscribers of a web service running on the computer system, by performing the steps of:
   receiving a request to borrow a copy of digital media from a borrower-subscriber;
   verifying that the digital copy was purchased by an owner-subscriber of the digital copy through an ecommerce store component of the web service and has not been downloaded to a personal computer by the owner-subscriber;
   if the verifying step determines that the digital copy was not purchased by the owner-subscriber through the ecommerce store component or that the digital copy has been downloaded to the personal computer, denying the request to borrow the digital copy; and if the verifying step determines that the digital copy was purchased by the owner-subscriber through the ecommerce store and has not been downloaded to the personal computer, copying the copy of digital media from an account of the owner-subscriber of the copy into an account of the borrower-subscriber thereby enabling access to the copy by the borrower-subscriber through the web service, and removing the copy from the account of the owner-subscriber thereby prohibiting access to the copy by the owner-subscriber.

16. The non-transitory computer readable storage medium of claim 15 wherein the computer program may further be executed on the server to carry out the following steps upon an occurrence of a return event for the copy:

copying the copy from the account of the borrower-subscriber into the account of the owner-subscriber thereby enabling access to the copy by the owner-subscriber through the web service; and removing the copy from the account of the borrower-subscriber thereby prohibiting access to the digital copy by the borrower-subscriber.

17. The non-transitory computer readable storage medium of claim 16 wherein the computer program may further be executed on the server to carry out the steps of:

establishing a network connection with a mobile device of the borrower-subscriber; and removing the digital copy from the mobile device.

18. The non-transitory computer readable storage medium of claim 16 wherein the return even for the copy is selected from the group consisting of a recall request of the copy by the borrower-subscriber and an expiration of a borrowing period associated with the copy.

19. The non-transitory computer readable storage medium of claim 15 wherein the computer program may further be executed on the server to carry out the steps of:

if access to the digital copy has been enabled for the borrower-subscriber, establishing a network connection with a mobile device of the borrower-subscriber; and downloading the digital copy onto the mobile device.

20. The non-transitory computer readable storage medium of claim 15 wherein the step of copying is implemented by adding a pointer associated with the account of the borrower-subscriber to the memory address of the copy of digital media and the step of removing is implemented by deleting a pointer associated with the account of the owner-subscriber to the memory address of the digital copy.

* * * * *